Dec. 24, 1968 W. BROOKS 3,418,652

PROGRAMMING DEVICE AND SAWTOOTH GENERATOR THEREFOR

Filed Sept. 13, 1965 3 Sheets-Sheet 1

INVENTOR
WILLIAM BROOKS
BY
Owen, Wickersham & Erickson
ATTORNEYS

INVENTOR
WILLIAM BROOKS
BY
Owen, Wickersham & Erickson
ATTORNEYS

PROGRAMMING DEVICE AND SAWTOOTH GENERATOR THEREFOR

Filed Sept. 13, 1965 3 Sheets-Sheet 3

INVENTOR
WILLIAM BROOKS
BY
Owen, Wickersham & Erickson
ATTORNEYS

United States Patent Office 3,418,652

Patented Dec. 24, 1968

3,418,652

PROGRAMMING DEVICE AND SAWTOOTH GENERATOR THEREFOR

William Brooks, 1042 Inverness, Sunnyvale, Calif. 94087

Filed Sept. 13, 1965, Ser. No. 486,637
10 Claims. (Cl. 340—324)

This invention relates to an optoelectronic programming device. It also relates to a novel sawtooth generator.

The programmer of this invention has many uses. For example, it can be used as a scanning switch. It can be used in connection with display signs to cause electric lights to spell out words, and it is applicable to electroluminescent signs in this connection, to cause them to spell.

Heretofore, such programmers have usually been made from electric motors that made and broke physical electric contacts. The make-and-break created electrical interference on television and radio sets. They were relatively high in cost to start with, and it was difficult to change the programs, because this usually involved changing mechanical cams or substituting mechanical parts. Also, there was usually a practical limit to the complexity of the program, and this limit was usually on quite a low level.

The present invention solves many of these problems and provides a low-cost, flexible, readily adaptable nonmechanical programmer.

One object of the invention is to provide an all-electronic scanning switch, capable of use in displays and instruments.

Another object is to provide low-cost spelling units for display signs.

Another abject is to provide an optoelectronic sawtooth voltage generator.

Another object is to provide a scanning switch without physical electrical contacts that are made and broken and without any electrical motor.

A further object is to eliminate the problem of radio and television interference from programming devices.

Still another object is to enable changes in program to be made readily and quickly and without changing mechanical parts.

Another object is to enable more complex programming and, as a result, more effective displays.

Other objects and advantages of the invention will appear from the following description of some preferred embodiments thereof.

Figure 1:
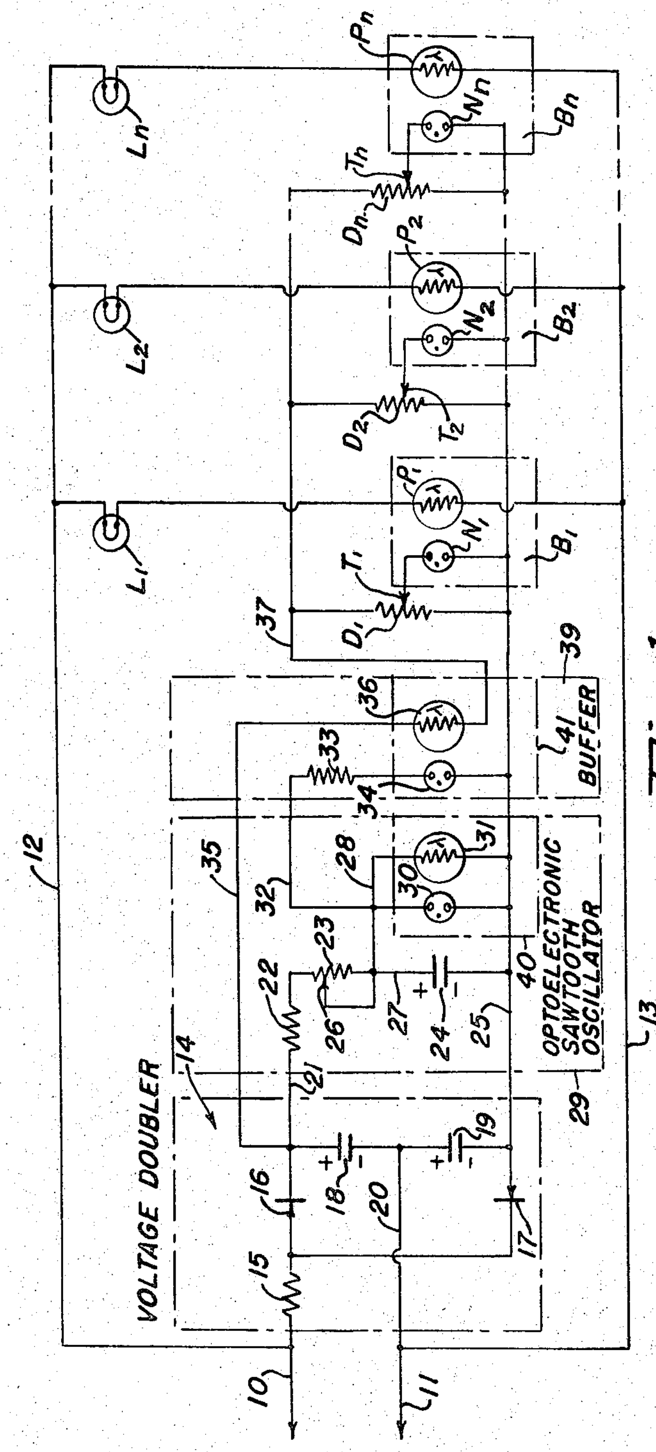
FIG. 1 is an electrical circuit diagram of a programmer embodying the principles of this invention in a circuit for controlling incandescent light bulbs to effect a spelling type of program.
Figure 2:
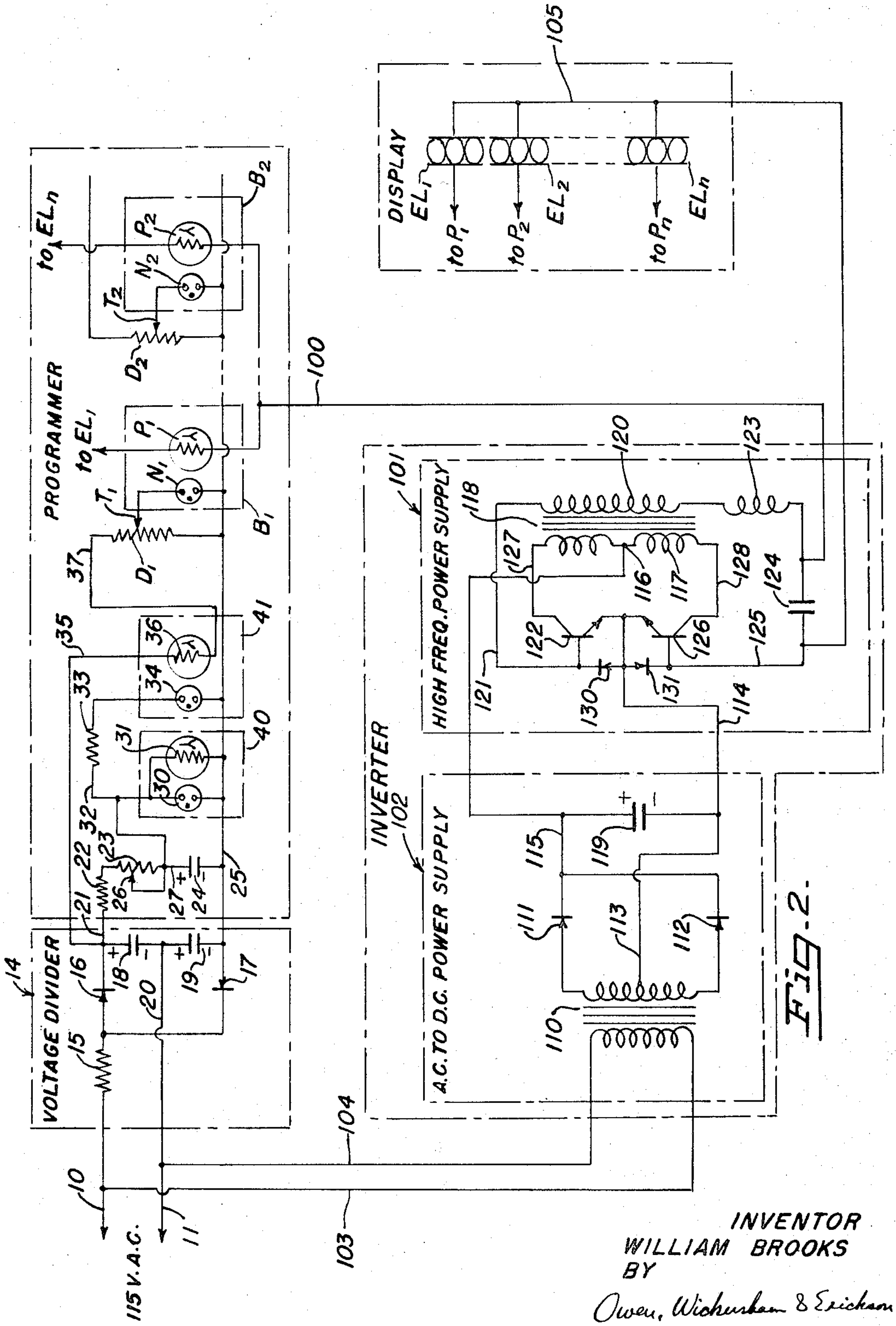
FIG. 2 is a similar diagram of a modified form of the circuit of this invention in which an alternating current input is used in connection with a spelling circuit for an electroluminescent display device.
Figure 3:
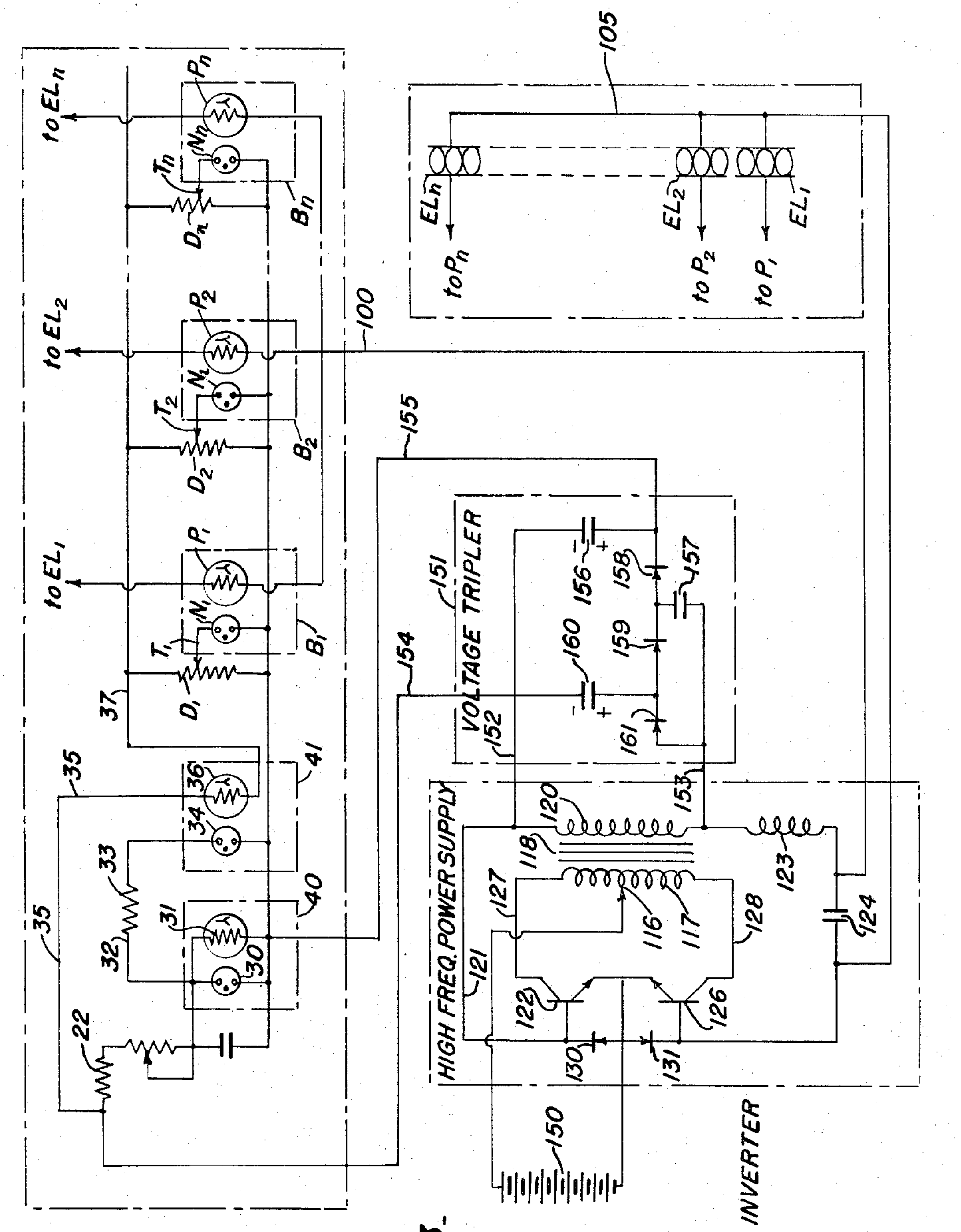

FIG. 3 is a diagram similar to FIG. 2 of another modified form of the circuit of this invention for a spelling type of electroluminescent display controlled by a direct current source The circuit of FIG. 1 may be used for programming the lighting of a series of incandescent light bulbs. Of course, in place of incandescent light bulbs, other electrical devices can be directly substituted. Input lines 10 and 11 supply current, which may be 115-volt 60-cycle alternating current. From the line 10 a bus line 12 goes to one side of each of the lamps $L_1, L_2 \ldots L_n$. From the line 11 a bus line 13 leads to the other side of each of the light bulbs $L_1, L_2 \ldots L_n$ through respective photoconductors $P_1, P_2 \ldots P_n$. The programmer circuit of FIG. 1 enables the lamps $L_1, L_2 \ldots L_n$ to be lighted sequentially. For the moment it will be assumed that they are to be lighted in the order of their subscript; if this is for any reason not desirable, the sequence is easily changed to any other order.

The input lines 10 and 11 are connected also to a voltage doubler 14. For example, the line 10 may be connected through a resistor 15, typically 20 to 120 ohms, to a pair of rectifiers 16 and 17 acting in opposite directions to provide full-wave rectification. The rectifier 16 is connected to one side of a capacitor 18 while the rectifier 17 is connected to one side of another capacitor 19. The opposite sides of both capacitors 18 and 19 (typically 2 microfarads each) are connected through line 20 to the line 11.

The rectifier 16 is connected by a lead 21 to a sawtooth oscillator 29 which includes a large (e.g. 20 to 25 megohms) resistor 22. A potentiometer 23, typically 500,000 ohms, provides a trim adjustment for accurately matching the resistor 22 to a total value. The resistor 22 is connected through the potentiometer 23 to a charging condenser 24, typically 2 microfarads, which forms an important element of a sawtooth oscillator and is connected to a bus line 25 which leads back to the rectifier 17. A center tap 26 of the potentiometer 23 is connected by a lead 27 to the sawtooth oscillator's condenser 24 (for obtaining the trim adjustment of the resistor 22). The lead 27 is also connected by a lead 28 to both a neon lamp 30 and a photoconductor 31, which form important parts of the sawtooth oscillator. The lamp 30 preferably does not fire until subjected to a voltage of about 300 volts, and the photoconductor 31 may be a cadmium sulfide device that normally offers a resistance of about 100 megohms and drops about 300 ohms when the neon bulb 30 fires. The opposite sides of both the photoconductor 31 and the neon lamp 30 are connected to the bus 25.

The lead 28 is also connected to a buffer through a lead 32 which goes to a resistor 33 (typically two to ten megohms) to a second neon lamp 34, the other side of which is again connected to the bus 25. This second neon lamp 34 is used in an optoelectronic amplifier and may fire at about 90 volts. The rectifier 16 is further connected by a lead 35 to a photoconductor 36, the opposite side of which is connected to a bus line 37. This photoconductor 36 is used as part of the optoelectronic amplifier or buffer 39 and provides the voltage for the bus line 37.

A voltage divider $D_1$ is connected across the buses 37 and 25, and a center tap $T_1$ of this voltage divider $D_1$ is connected through a neon lamp $N_1$ to the bus 25. This neon lamp $N_1$ is used in conjunction with the photoconductor $P_1$ which controls the lighting of the lamp $L_1$.

All the neon lamps and photoconductors are in pairs, with one of each in a separate light-tight box. Thus, the neon lamp 30 and its associated photoconductor 31 are in a light-tight box 40. In a similar manner, the neon lamp 34 and the photoconductor 36 are in a light-tight box 41. Similarly, the neon lamp $N_1$ and the photoconductor $P_1$ are in a box $B_1$. Similarly, the photoconductor $P_2$ is in a box $B_2$ with a neon lamp $N_2$, and so on for the rest of the pairs, the photoconductor $P_n$ and a neon lamp $N_n$ being in a box $B_n$.

The circuit beginning with the $N_1$, $P_1$ combination (e.g., $N_2$, $P_2$ to $N_n$, $P_n$) are all basically alike, except for certain circuit values. Thus, each subsequent circuit is also across the bus lines 37 and 25, and each has a voltage divider such as the dividers $D_2$ and $D_n$ with center taps $T_2$ and $T_n$, respectively connected to neon lamps $N_2$ and $N_n$. All the neon bulbs $N_1, N_2 \ldots N_n$ may be of the type which fires at about 120 volts and has a maintaining voltage of about 65 volts. The photoconductors may all be like the photoconductor 31. The voltage dividers $D_1, D_2 \ldots D_n$ may typically be 500,000 ohms each and may be potentiometers or may be made up of two resistors preferably adding to the same total in all cases, each being divided differently by their respective taps $T_1, T_2 \ldots T_n$.

Since each neon bulb and its photoconductor are in a separate light-tight enclosure, it will be apparent that each photoconductor becomes conductive when and only when its corresponding neon lamp is lighted. Since each neon lamp of the series $N_1, N_2 \ldots N_n$ is connected to a voltage divider, the percetage of the bus voltage applied to each neon bulb can be set at a different value and the values can be varied in order to effect sequencing; these facts enable the programming. By providing for a relatively low resistance at the first center tap $T_1$ and a higher one for the next center tap $T_2$ and still higher ones for each successive one, through the center tap $T_2$, the lamps $L_1, L_2 \ldots L_n$ are fired in sequence of their subscript. In a similar manner, they can be fired in different sequence by rearranging the resistance values of their center taps. Each neon bulb has a specific firing point voltage, and the voltage applied with time depends upon the setting of its voltage divider, so that each neon bulb can be made to come on at any particular time and in any order by adjusting the various voltage dividers.

The bus voltage is varied in amplitude with time by use of the other neon-bulb-photoconductor pairs 30, 31 and 34, 36. In order to cause the neon bulbs $N_1, N_2 \ldots N_n$ to be scanned or to cycle, the bus voltage is varied in time according to a definite program. For example, if the programmer is to be used to spell out the words in a display sign, each neon lamp $N_1, N_2 \ldots N_n$ should come on, stay on until the word is spelled, and then all the neon bulbs $N_1, N_2 \ldots N_n$ should go off simultaneously, cutting off all the photoconductors $P_1, P_2 \ldots P_n$ and therefore all the lamps $L_1, L_2 \ldots L_n$. Then the cycle is ordinarily repeated. A program of this type requires the bus voltage to follow a sawtooth wave form. The device of this invention employs a neon sawtooth oscillator to perform this function.

In the present invention, the very high impedance consisting of the large resistor 22 (plus the trim potentiometer 23) and the neon bulb 30 are connected together and to the condenser 24.

The condenser 24 builds up a charge until it fires the neon bulb 30. Each time that the neon bulb 30 fires, the photocell 31 connected across the sawtooth oscillator capacitor 24 is illuminated and pulls the charging capacitor down to near zero potential. Note that normally the capacitor 24 would drop only to just below the maintaining voltage of the sawtooth oscillator neon bulb 30, but the photocell 31, by dropping the voltage to about zero, gives the system an additional delay before starting a new scan cycle, and this has been found to be attractive in display applications.

The light output of the neon bulb 34 is proportional to the voltage of the charging capacitor 24, and this neon bulb 34, in turn, illuminates the photoconductor 36, which is in series with the constant potential bus 35 and the scanning bus 37. The combination of this neon bulb 34 (being connected across the sawtooth oscillator capacitor 24) and its associated photoconductor 36 acts as a very high gain amplifier to isolate the charging capacitor 24 from the load. The buffer 39 thus prevents overloading of the capacitor 24 and supplies milliamps to the bus 37 when the buffer 39 is supplied with microamps.

The scanning neon voltage bus 37 thus follows the voltage across the sawtooth oscillator charging capacitor 24. The circuits are completely isolated by the buffer 39, and load variations of the scanning bus do not affect the oscillator 29.

The sawtooth oscillator neon bulb 30 is chosen, as said, to fire at a high voltage to enable a large scanning voltage, a typical firing voltage being in the region of 250 to 300 volts. The buffer neon bulb 34 which is connected across the charging capacitor 24 preferably fires at a relatively low voltage, with its light output increasing as the voltage of the capacitor 24 builds up. Typically, such a bulb will fire at approximately 70 to 90 volts. The scanning neon bulbs $N_1, N_2 \ldots N_n$ are chosen to have stable firing points, and in order to assure stability, the firing voltage is preferably much higher than the maintaining voltage. Thus, a typical firing voltage may be 110 or 120 volts with a maintaining voltage of about 65 volts. The light output at the maintining voltage is sufficient to operate the photoconductors $P_1, P_2 \ldots P_n$ as switches to turn on the lamps $L_1, L_2 \ldots L_n$.

Any number of outputs, of course, can be employed, provided that the sawtooth scan voltage is wide enough to enable separation of the output firing points. In general, I have found that steps of about 10 volts are advisable, since the neon firing points are often not settable to a higher degree without a special selection of neon bulbs, due to the degree of resolution of which the commercial bulbs are capable. Of course, as commercial bulbs improve, the steps can be made of different magnitudes.

The device of FIG. 2 is similar to that of FIG. 1, except that here the device is made to operate an electroluminescent display such as a series of electroluminescent devices of the type shown in my patent application Ser. No. 402,104, filed Oct. 7, 1964, now Patent No. 3,310,703, although many other types of electroluminescent devices can be used. In general, it may be said that electroluminescent devices are capacitors, typically with values of about 70 to 100 micro-microfarads per square inch, so that they present a low-impedance high-current load to a high-frequency power source. For that reason, it is advisable to make changes in the power source as applied to those bulbs. The 115-volt AC source may again be used with the voltage doubler 14 substantially as described before and with the same reference numerals indicating basically the same members. Similarly, the programmer itself may be substantially identical to what has been described with the sole exception that the photoconductors $P_1$, $P_2$, etc., through $P_n$ are connected by a line 100 to the output from a high-frequency power supply 101, which in turn is connected to an inverter (AC-to-DC) power supply 102, and that is connected by lines 103 and 104 to the lines 10 and 11. Each photoconductor $P_1, P_2 \ldots P_n$ leads to an electroluminescent display device $EL_1, EL_2 \ldots EL_n$ and each of these is connected to a bus line 105 which leads back to the high-frequency power supply 101.

The inverter power supply may comprise a transformer 110 across the lines 103 and 104 with its secondary having its ends connected to rectifiers 111 and 112 and a center tap connected by leads 113 and 114 to the high-frequency power supply 101. The rectifiers 111 and 112 supply full-wave rectified voltage to a lead 115 which is connected to a center tap 116 of the primary 117 of a transformer 118 in the high-frequency power supply 101. A capacitor 119, typically 2 microfarads, is preferably connected across the leads 114 and 115.

The transformer secondary 120 is connected by a lead 121 to the base of an NPN type transistor 122. The opposite end of the secondary 120 is connected through an inductance coil 123, typically 100 millihenries, a condenser 124, typically 1000 micro-microfarads, and a lead 125 to the base of a transistor 126. A lead 127 connects one end of the transformer primary 117 to the collector of the transistor 122, while the collector of the transistor 126 is connected by a lead 128 to the other end of the primary 117. The lines 100 and 105 are coupled to the condenser 124 so that all the electroluminescent devices, $EL_1, EL_2 \ldots EL_n$ and their series-connected corresponding photoconductors $P_1, P_2 \ldots P_n$ are in parallel with the condenser 124. This is quite practical, since the electroluminescent devices act as capacitances and are therefore easily capacitance-coupled.

The emitter of each NPN type transistor 122 and 126 is connected to the lead 114, so that the emitters conduct from the transistors to the lead 114. Bypass rectifiers 130 and 131 are provided between the leads 121 and 125 and the lead 114.

In this setup, the AC-to-DC power supply converts the alternating current input voltage of lines 103 and 104 by full-wave rectification and transformation to a different pulsating DC voltage somewhat smoothed out by the condenser 119. This pulsating voltage is then applied to the high-frequency power supply 101 via the center tap 116 of the primary 117 and from there via the transistors 130 and 131 to the lead 114.

The result of the device is that the transistors 130 and 131 conduct alternately, for a reason which will soon become apparent. Each time one of the two transistors conducts the current from the primary 117 to the return lead 114, a voltage is induced in the secondary winding 120. Because the direction of the current changes through the primary 117 as each transistor 122, 126 conducts, an alternating voltage is induced in the secondary 120. The secondary 120, being connected through the conductance 123 and capacitor 124 back to the transistors 126 and 122 in such a manner that positive feedback occurs, drives the conducting transistor on hard. The conducting transistor 122 or 126 remains on until the capacitor 124 charges to the output voltage of the secondary 120, at which time the current in the secondary goes to zero and the transistor 122 or 126 that had been conducting turns off because its base receives no drive current. The capacitor 124 then discharges so that the current in the secondary is reversed and drives the other transistor 126 or 122 on. The diodes 130 and 131 provide bypasses for the off-transistor. Thus, in any one cycle the current will flow in one direction for half the time and the other direction for half the time. For example, assume that the voltage applied to the primary 117 goes from the center tap 116 to the lead 127 and there to the transistor 122 and thence to the lead 114. The secondary 120 will then flow in the opposite direction to the inductance 123, capacitor 124, lead 125, to the base of the transistor 126, causing that transistor to go on, so that current being conducted from the primary 117 through the line 128 will go through the emitter to the lead 114. At the same time, current will also flow through the rectifier 130 and line 121 back to the other side of the secondary. When the condenser 124 is changed to the value of the secondary, the current is reversed and flows in the opposite direction.

The time constant for the charging of the capacitor 124 is dependent on its value and on the value of the inductance 123. The LC combination forms a series resonant circuit, so that the voltage in the secondary is a sine wave voltage. Furthermore, due to the resonance of the secondary circuit, a rise in the voltage appears across either the inductance or the capacitor of a value equal to Q times the voltage induced in the secondary winding, so that the transistor amplification factor Q becomes important. Since the circuit is resonant, the power source need only supply the current necessary to make up the losses, so that a large secondary current may flow with only a small primary current. Thus, the circuit is ideal for driving capacity loads such as are presented by the electroluminescent display devices.

FIG. 3 shows how the electroluminescent display device may be operated with the same programmer as shown in FIG. 1 by a battery source 150. In this instance the battery 150 is connected directly to the high-frequency power supply just as the AC-to-DC power supply 102 was connected to the supply 101 in FIG. 2. The main difference is that the high-frequency power supply is used through a voltage tripler 151 to supply also the voltage for operating the programmer. (In this instance, of course, the voltage doubler 14 is changed too because rectification is not needed.)

The voltage tripler 151 is connected in parallel with the secondary 120, a lead 152, and a lead 153 being applied. The lead 152 is connected to a lead 154 which is connected to the lead 35 and to the resistor 22 in the programmer, just as is the output of the voltage doubler 14. The line 25 is connected by a line 155 back to the voltage tripler. A condenser 156 lies across the line 152 and 155. The line 153 is connected to a condenser 157 in between a pair of rectifiers 158 leading to line 155 and 159 leading to a condenser 160 and through it to the lines 152 and 154. In parallel with the condenser 160 is a rectifier 161 which leads to the line 157. Thus, the battery supplies not only the high-frequency power supply for the electroluminescent devices but the power for the programmer as well.

I claim:

1. An optoelectronic programming device, including in combination:
   - a sawtooth oscillator comprising a large resistance and a condenser in series across a source of power, a first neon bulb in parallel with said condenser and in series with said large resistance, and a first photoconductor illuminated by said first neon bulb and in parallel with it and with said condenser,
   - buffer means across said oscillator, for isolating said condenser from the output voltage of the oscillator,
   - a group of programming circuits, fed by said output voltage,
   - each said programming circuit including a voltage divider set for a different output voltage from the other said voltage dividers, and a programming neon bulb fired by said output voltage at a lower voltage than said first bulb, and
   - a programmed circuit in association with each said programming circuit and including one programmed photoconductor illuminated by each said programming neon bulb, and a load and a power source in series with each said programmed photoconductor,
   - so that as said sawtooth oscillator is biulding up voltage by the charging of said condenser, said buffer means causes each said programming neon bulb to fire successively in order according to a program set by the said voltage dividers, until all said programming neon bulbs have fired and thereby have actuated said programmed loads successively in order, then when said first bulb fires, said condenser is discharged to about zero through said first photoconductor, for repetition of the program.

2. The device of claim 1 wherein said output voltage is greater than the maintaining voltage of said programming neon bulbs at all times except at an early part of the sawtooth cycle of said oscillator and below the firing voltage until the respective firing voltage is reached separately for each said programming neon bulb, so that a load once actuated is maintained for the rest of said cycle.

3. An optoelectronic programming device, including in combination:
   - a sawtooth oscillator comprising a large resistance and a condenser in series across a source of power, a first neon bulb in parallel with said condenser and having a high firing voltage, and a first photoconductor illuminated by said first neon bulb and in parallel with it and with said condenser,
   - an optoelectronic amplifier across said oscillator, comprising a series connected second neon bulb and a resistor in parallel with said condenser, said second bulb having a low firing voltage, and a circuit in parallel with said series-connected large resistance and condenser, said circuit including a second photoconductor illuminated by said second neon bulb and, in series, a group of programming circuits,
   - each said programming circuit including a voltage divider set for a different output voltage from the other said voltage dividers, and a programming neon bulb having a low firing voltage and fired by said output voltage, and a programmed circuit in assocaition with each said programming circuit and including one programmed photoconductor illuminated by each said programming neon bulb, and a load and a power source in series with each said programmed photoconductor, so that as said sawtooth oscillator is building up voltage by the charging of said condenser, said optoelectronic amplifier causes each said programming neon bulb to fire successively in order according to a program set by the said voltage dividers, until all said programming neon bulbs have fired and thereby have actuated said programmed loads successively in order, then when said first bulb fires, said condenser is discharged to about zero through said first photoconductor, for repetition of the program.

4. An optoelectronically programming spelling device, including in combination:

a sawtooth oscillator comprising a large resistance and a condenser in series across a source of power, a first neon bulb in parallel with said condenser, and in series with said large resistance, and a first photoconductor illuminated by said first neon bulb and in parallel with it and with said condenser, an optoelectronic buffer-amplifier across said oscillator, comprising a series connected second neon bulb having a firing voltage lower than that of said first bulb and a resistor in parallel with said condenser, and a circuit in parallel with said series-connected large resistance and condenser, said circuit including a second photoconductor illuminated by said second neon bulb and, in series, a group of programming circuits, each said programming circuit including a voltage divider set for a different output voltage from the other said voltage dividers, and a programming neon bulb having a firing voltage lower than that of said first bulb and fired by said output voltage, and a programmed circuit in association with each said programming circuit and including one programmed photoconductor illuminated by each said programming neon bulb, and a light and a power source for illumination of said light, all in series with each said programmed photoconductor, and letters illuminated by said lights when they are lighted, so that as said sawtooth oscillator is building up voltage by the charging of said condenser, said optoelectronic amplifier causes each said programming neon bulb to fire successively in order according to a program set by the said voltage dividers, until all said programming neon bulbs have fired and thereby have actuated said programmed loads successively in order, then when said first bulb fires, said condenser is discharged to about zero through said first photoconductor, for repetition of the program.

5. The spelling device of claim 4 wherein said programming neon bulbs have a maintaining voltage lower than their firing voltage and lower than the voltage put out when said second bulb is fired.

6. The spelling device of claim 4 wherein said lights comprise electroluminescent devices and said power source includes an inverter therefor.

7. The spelling device of claim 6 wherein said inverter comprises a DC power supply, a transformer having a primary with a center tap connected to one side of said power supply and a secondary, a pair of transistors with their bases connected to opposite ends of said secondary, one being so connected through a condenser and coil in series, the collectors of said transistors being connected to the ends of said primary and their emitters being connected to the other side of said power supply.

8. An optoelectronic programming device, including in combination:

a sawtooth oscillator comprising a large resistance and a condenser in series across a source of power, a first neon bulb in parallel with said condenser, and a first photoconductor illuminated by said first neon bulb and in parallel with it and with said condenser, an optoelectronic amplifier across said oscillator, comprising a second neon bulb in series with a resistor with that bulb and resistor in parallel across said condenser, and a second photoconductor illuminated by said second neon bulb and in a circuit that is in parallel with said large resistance and condenser series, said circuit also including in series with said second photoconductor a series of programming circuits, each said programming circuit including a voltage divider set for a different output voltage and a programming neon bulb fired by said output, a programming photoconductor for each said programming neon bulb, and a programmed load and power source in series with each said programming photoconductor, so that as said sawtooth oscillator is building up by the charging of said condenser, said optoelectronic amplifier causes each said programming neon bulb to fire successively according to the program set by its said voltage divider, until all said programming neon bulbs have fired and thereby have actuated said programmed loads successively, then when said first bulb fires, said condenser is discharged to about zero through said first photoconductor.

9. A sawtooth oscillator comprising a large resistance and a condenser in series across a source of power, a neon bulb in parallel with said condenser, and a photoconductor illuminated by said neon bulb and in parallel with it and with said condenser.

10. A buffered sawtooth oscillator comprising a large resistance and a condenser in series across a source of power, a first neon bulb in parallel with said condenser, a first photoconductor illuminated by said first neon bulb and in parallel with it and with said condenser, a second neon bulb in series with a resistor, said second bulb and resistor being in parallel across said condenser, and a second photoconductor illuminated by said second neon bulb and in parallel with said large resistance and condenser series, said second bulb firing at a substantially lower voltage than said first bulb, whereby as said sawtooth oscillator is building up by the charging of said condenser, said second photoconductor is actuated by the firing of said second bulb and its continuing increase in brilliance to supply a gradually increasing output voltage isolated from said condenser and when said first bulb fires, said condenser is discharged to about zero through said first photoconductor.

References Cited

UNITED STATES PATENTS

| | | | |
|---|---|---|---|
| 2,821,657 | 1/1958 | Newhouse | 307—228 |
| 3,058,013 | 10/1962 | Acker | 307—228 |
| 3,206,650 | 9/1965 | Miller et al. | 315—158 |
| 3,268,733 | 8/1966 | Deelman et al. | 331—66 |
| 3,348,104 | 10/1967 | Zielinski. | |
| 3,365,647 | 1/1968 | Stone | 315—158 |

OTHER REFERENCES

Electronics World, September 1965, pp. 38–39.

JOHN W. CALDWELL, *Primary Examiner.*

ALAN J. KASPER, *Assistant Examiner.*

U.S. Cl. X.R.

235—92; 250—209; 307—228, 311; 315—84.5, 158; 331—66, 129